United States Patent
Yamamoto et al.

(10) Patent No.: US 10,989,092 B2
(45) Date of Patent: Apr. 27, 2021

(54) HONEYCOMB STRUCTURED BODY

(71) Applicants: IBIDEN CO., LTD., Ogaki (JP); TOYOTA JIDOSHA KABUSHIKI KAISHA, Toyota-shi (JP)

(72) Inventors: Hiroya Yamamoto, Ibi-gun (JP); Takeru Yoshida, Toyota (JP); Hiromasa Suzuki, Toyota (JP); Masaru Kakinohana, Toyota (JP); Takumi Tojo, Toyota (JP)

(73) Assignees: IBIDEN CO., LTD., Ogaki (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/745,217

(22) Filed: Jan. 16, 2020

(65) Prior Publication Data
US 2020/0232368 A1 Jul. 23, 2020

(30) Foreign Application Priority Data

Jan. 17, 2019 (JP) .............................. JP2019-006206

(51) Int. Cl.
*F01N 3/28* (2006.01)
*F01N 3/021* (2006.01)
*F01N 3/022* (2006.01)

(52) U.S. Cl.
CPC .......... *F01N 3/2828* (2013.01); *F01N 3/0211* (2013.01); *F01N 3/0222* (2013.01)

(58) Field of Classification Search
CPC ..... F01N 3/2828; F01N 3/0211; F01N 3/0222
USPC ..................... 422/177, 180; 55/523; 428/116
See application file for complete search history.

(56) References Cited

U.S. PATENT DOCUMENTS

| | | | |
|---|---|---|---|
| 2006/0193756 A1* | 8/2006 | Suzuki | B01J 35/108 422/177 |
| 2006/0292333 A1* | 12/2006 | Ohno | F01N 3/2828 428/116 |
| 2009/0239734 A1* | 9/2009 | Yamazaki | C04B 35/195 501/141 |

FOREIGN PATENT DOCUMENTS

| | | |
|---|---|---|
| JP | 64-37467 | 2/1989 |
| JP | 2015-085241 | 5/2015 |
| WO | WO 2018/012564 | 1/2018 |

* cited by examiner

*Primary Examiner* — Tom P Duong
(74) *Attorney, Agent, or Firm* — Mori & Ward, LLP

(57) ABSTRACT

The present invention provides a honeycomb structured body containing a ceria-zirconia composite oxide and being less susceptible to ring-off cracking. The honeycomb structured body of the present invention includes a honeycomb fired body in which multiple through-holes are arranged longitudinally in parallel with one another with a partition wall therebetween, wherein the honeycomb fired body contains ceria-zirconia composite oxide particles and inorganic fibers, and a b-axis thermal expansion coefficient measured in a direction along a b-axis representing a direction perpendicular to a longitudinal direction of the honeycomb structured body is higher than an a-axis thermal expansion coefficient measured in a direction along an a-axis representing the longitudinal direction of the honeycomb structured body.

4 Claims, 1 Drawing Sheet

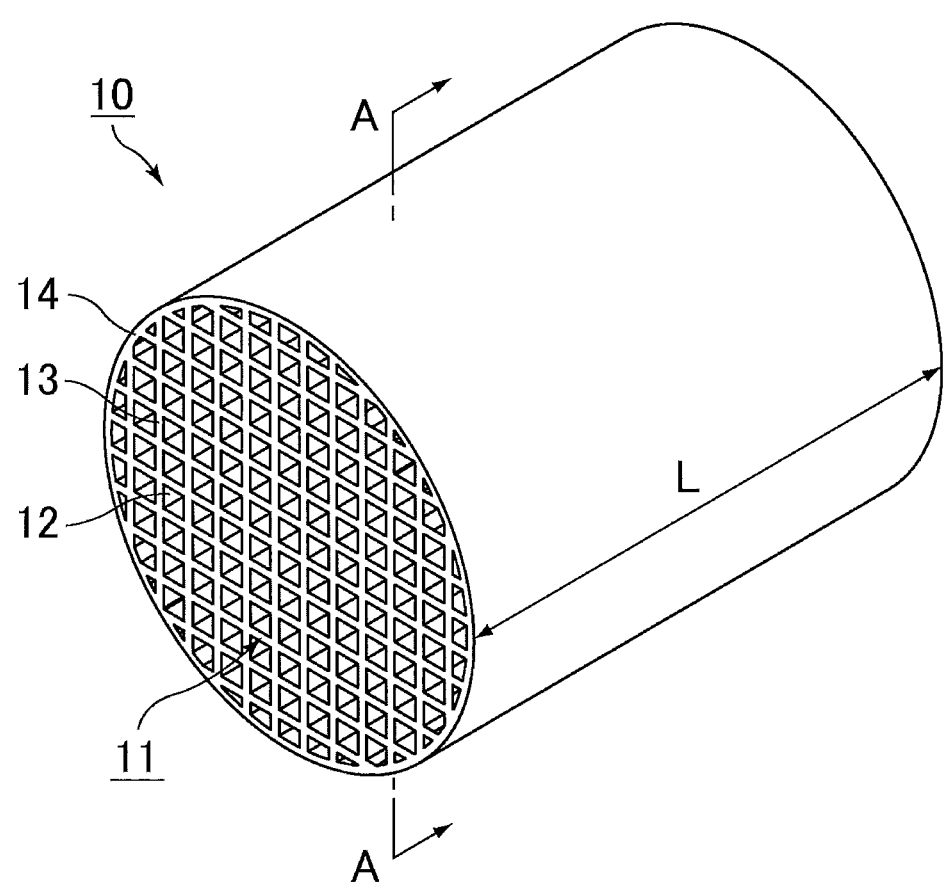

HONEYCOMB STRUCTURED BODY

TECHNICAL FIELD

The present invention relates to a honeycomb structured body.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating the slurry containing precious metal particles having catalytic activity on a honeycomb-shaped monolithic substrate made of cordierite or the like.

Patent Literature 1 discloses an exhaust gas catalytic converter including a monolithic substrate containing ceria-zirconia composite oxide particles and θ-phase alumina particles, wherein noble metal particles are supported on the monolithic substrate.

CITATION LIST

Patent Literature

Patent Literature 1: JP 2015-85241 A

SUMMARY OF INVENTION

Technical Problem

In the exhaust gas catalytic converter disclosed in Patent Literature 1, the monolithic substrate contains ceria-zirconia composite oxide particles and θ-phase alumina particles.

A monolithic substrate containing a ceria-zirconia composite oxide has a high thermal expansion coefficient, and may be susceptible to cracks due to temperature changes. In particular, in the event of a failure mode called ring-off cracking where the monolithic substrate breaks from cracking in a b-axis direction (a direction perpendicular to a longitudinal direction of a honeycomb structured body), the monolithic substrate may fall out.

The present invention is made to solve the above problem, and aims to provide a honeycomb structured body containing a ceria-zirconia composite oxide and being less susceptible to ring-off cracking.

Solution to Problem

The present invention provides a honeycomb structured body including a honeycomb fired body in which multiple through-holes are arranged longitudinally in parallel with one another with a partition wall therebetween, wherein the honeycomb fired body contains ceria-zirconia composite oxide particles and inorganic fibers, and a b-axis thermal expansion coefficient measured in a direction along a b-axis representing a direction perpendicular to a longitudinal direction of the honeycomb structured body is higher than an a-axis thermal expansion coefficient measured in a direction along an a-axis representing the longitudinal direction of the honeycomb structured body.

In the honeycomb structured body, the b-axis thermal expansion coefficient is higher than the a-axis thermal expansion coefficient. In this case, when a temperature difference occurs in the honeycomb structured body, a greater tensile stress is applied to the b-axis direction of the honeycomb structured body, and cracking initially occurs in a direction along the a-axis. Cracking in this direction is not ring-off cracking. Even if cracking occurs in this direction, the honeycomb structured body is less likely to fall out. Thus, such cracking is a minor failure mode, as compared to the case of ring-off cracking.

In other words, the honeycomb structured body of the present invention is considered to be a honeycomb structured body less susceptible to ring-off cracking.

In the honeycomb structured body of the present invention, the a-axis thermal expansion coefficient is preferably $7.5 \times 10^{-6}$/K or more and less than $8.0 \times 10^{-6}$/K.

In the honeycomb structured body of the present invention, the b-axis thermal expansion coefficient is preferably $8.0 \times 10^{-6}$/K or more and $8.5 \times 10^{-6}$/K or less.

In the honeycomb structured body of the present invention, a difference between the b-axis thermal expansion coefficient and the a-axis thermal expansion coefficient ((b-axis thermal expansion coefficient)−(a-axis thermal expansion coefficient)) is preferably 0.1 to $1.0 \times 10^{-6}$/K.

When the a-axis thermal expansion coefficient, the b-axis thermal expansion coefficient, and the difference between the b-axis thermal expansion coefficient and the a-axis thermal expansion coefficient are set within these ranges, a honeycomb structured body even less susceptible to ring-off cracking can be produced.

Preferably, in the honeycomb structured body of the present invention, at least 60% of inorganic fibers observed in a cross-sectional image of the honeycomb structured body cut in a cross-sectional direction perpendicular to a longitudinal direction have a ratio of the length of a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

With regard to the orientation of the inorganic fibers defined above, when the ratio of long axis/short axis is 1.00, it means that the inorganic fibers are oriented completely parallel to the longitudinal direction (hereinafter also referred to as the "a-axis direction") of the honeycomb structured body. Inorganic fibers each having a ratio of long axis/short axis of 1.00 to 1.30 are considered to be oriented in the a-axis direction although somewhat tilted from the a-axis direction, and that such inorganic fibers are present in a proportion of at least 60% means that many inorganic fibers are oriented in the a-axis direction.

When many inorganic fibers are oriented in the a-axis direction as described above, the thermal expansion coefficient in the a-axis direction decreases. Thus, a honeycomb structured body less susceptible to ring-off cracking can be produced.

BRIEF DESCRIPTION OF DRAWINGS

The FIGURE is a perspective view schematically showing an exemplary honeycomb structured body of the present invention.

DESCRIPTION OF EMBODIMENTS

[Honeycomb Structured Body]

The honeycomb structured body of the present invention is described.

The FIGURE is a perspective view schematically showing an exemplary honeycomb structured body of the present invention.

As shown in the FIGURE, a honeycomb structured body 10 includes a honeycomb fired body 11 in which multiple through-holes 12 are arranged longitudinally (a direction indicated by a double-headed arrow L in the FIGURE) in parallel with one another with a partition wall 13 therebetween, and an outer peripheral wall 14 on the outermost periphery.

The honeycomb fired body 11 contains ceria-zirconia composite oxide particles (hereinafter also referred to as "CZ particles") and inorganic fibers.

When the honeycomb structured body 10 includes only one honeycomb fired body 11 as shown in the FIGURE, the honeycomb fired body 11 is the honeycomb structured body.

In the honeycomb structured body of the present invention, the honeycomb fired body contains CZ particles and inorganic fibers.

As described later, the honeycomb fired body is produced by extruding a raw material paste containing CZ particles and inorganic fibers, and firing the resulting extrudate.

Whether or not the honeycomb structured body of the present invention contains the CZ particles can be confirmed by X-ray diffraction (XRD).

The honeycomb structured body may further contain alumina particles and an inorganic binder.

In the honeycomb structured body of the present invention, the b-axis thermal expansion coefficient measured in a direction along the b-axis representing a direction perpendicular to the longitudinal direction of the honeycomb structured body is higher than the a-axis thermal expansion coefficient measured in a direction along the a-axis representing the longitudinal direction of the honeycomb structured body.

In the honeycomb structured body, the b-axis thermal expansion coefficient is higher than the a-axis thermal expansion coefficient. In this case, when a temperature difference occurs in the honeycomb structured body, a greater tensile stress is applied to the b-axis direction of the honeycomb structured body, and cracking initially occurs in a direction along the a-axis. Cracking in this direction is not ring-off cracking. Even if cracking occurs in this direction, the honeycomb structured body is less likely to fall out. Thus, such cracking is a minor failure mode, as compared to the case of ring-off cracking.

In other words, the honeycomb structured body of the present invention is considered to be a honeycomb structured body less susceptible to ring-off cracking.

The a-axis thermal expansion coefficient and the b-axis thermal expansion coefficient can be measured using a thermal expansion meter.

The thermal expansion meter may be DIL 402C available from NETZSH, for example.

The measurement temperature range is 40° C. to 800° C., the heating rate is 10° C./min, and the gas flow rate is 100 ml/min in air. The reference material is sapphire.

The size of a test piece is 3.5 mm×3.5 mm (3 cells×3 cells)×25 mm.

The a-axis thermal expansion coefficient and the b-axis thermal expansion coefficient are measured for each of five test pieces, and the average is calculated as a measurement result.

The a-axis thermal expansion coefficient thus measured is preferably $7.5\times10^{-6}$/K or more and less than $8.0\times10^{-6}$/K. The b-axis thermal expansion coefficient is preferably $8.0\times10^{-6}$/K or more and $8.5\times10^{-6}$/K or less.

Further, a difference between the b-axis thermal expansion coefficient and the a-axis thermal expansion coefficient ((b-axis thermal expansion coefficient)−(a-axis thermal expansion coefficient)) is preferably 0.1 to $1.0\times10^{-6}$/K.

When the a-axis thermal expansion coefficient, the b-axis thermal expansion coefficient, and the difference between the b-axis thermal expansion coefficient and the a-axis thermal expansion coefficient are set within these ranges, a honeycomb structured body even less susceptible to ring-off cracking can be produced.

Preferably, at least 60% of inorganic fibers observed in a cross-sectional image (hereinafter also simply referred to as a "cross-sectional image of the honeycomb structured body") of the honeycomb structured body cut in a cross-sectional direction perpendicular to the longitudinal direction have a ratio of the length of a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

In a cross-sectional image of the honeycomb structured body, a long axis is drawn in each of circular cross sections and substantially elliptical cross sections of the inorganic fibers, and a perpendicular bisector to the long axis is drawn as a short axis.

When the ratio of the long axis to the short axis drawn as described above (long axis/short axis) is 1.00, it means that the inorganic fibers each having a true circular cross section are oriented completely parallel to the longitudinal direction (hereinafter also referred to as the "a-axis direction") of the honeycomb structured body. Inorganic fibers each having a ratio of long axis/short axis of 1.00 to 1.30 are considered to be oriented in the a-axis direction although somewhat tilted from the a-axis direction.

The ratio of long axis/short axis is calculated for each of 100 inorganic fibers shown in the cross-sectional image, and the proportion of inorganic fibers each having a ratio of long axis/short axis of 1.00 to 1.30 is determined. Preferably, at least 60% of inorganic fibers shown in the cross-sectional image have a long axis/short axis ratio of 1.00 to 1.30. This means that many inorganic fibers are oriented in the a-axis direction in the honeycomb structured body. When there are less than 100 inorganic fibers in one cross-sectional image, multiple cross-sectional images are taken randomly until 100 inorganic fibers are captured, and the values are calculated.

When many inorganic fibers are oriented in the a-axis direction, the thermal expansion coefficient in the a-axis direction decreases. Thus, a honeycomb structured body less susceptible to ring-off cracking can be produced.

The average fiber length of the inorganic fibers is not limited, but it is preferably 10 to 90 μm.

The average fiber diameter of the inorganic fibers is not limited, but it is preferably 1 to 5 μm.

The aspect ratio of the inorganic fibers is preferably 5 to 300, more preferably 10 to 200, still more preferably 10 to 100.

The average fiber length of the inorganic fibers can be adjusted by suitably changing crushing conditions of the fibers.

The average fiber diameter of the inorganic fibers can be adjusted by suitably changing the fiber diameter of an inorganic fiber precursor.

The proportion of the inorganic fibers is preferably 5 to 20 wt % relative to the weight of the honeycomb fired body. When the proportion of the inorganic fibers is 5 to 20 wt %, the effect of sufficiently increasing the strength can be achieved while the exhaust gas conversion performance is maintained.

The inorganic fibers may be formed from any material. Examples include alumina, silica, silicon carbide, silica alumina, glass, potassium titanate, and aluminum borate. Two or more of these may be used in combination. Of these, alumina fibers are preferred.

The alumina fibers are inorganic fibers containing 70 wt % or more of alumina, and may also contain other elements such as Si, in addition to Al.

In addition to the alumina fibers, the inorganic fibers may also contain silica fibers, silicon carbide fibers, glass fibers, aluminum titanate fibers, or the like.

The alumina fibers may be either crystalline alumina fibers or amorphous alumina fibers, and may be mixed fibers of crystalline alumina fibers and amorphous alumina fibers.

The alumina fibers are analyzed by powder X-ray diffraction (XRD) to determine those having a diffraction peak in 2θ of 25° to 30° as crystalline alumina fibers and those not having a diffraction peak in this range as amorphous alumina fibers.

The honeycomb structured body of the present invention may include a single honeycomb fired body or multiple honeycomb fired bodies. When the honeycomb structured body includes multiple honeycomb fired bodies, these multiple honeycomb fired bodies are preferably combined together with an adhesive layer.

In the honeycomb structured body of the present invention, the honeycomb fired body preferably contains 25 to 75 wt % of CZ particles.

When the honeycomb fired body contains 25 to 75 wt % of CZ particles, cerium can have higher oxygen storage capacity (OSC).

Examples of the shape of the honeycomb structured body of the present invention include a round pillar shape, a prism, a cylindroid shape, a pillar shape having an end face with a racetrack shape, and a prism with rounded corners (e.g., a triangular pillar shape with rounded corners).

In the honeycomb structured body of the present invention, preferably, the partition walls all have the same thickness. Specifically, the partition walls of the honeycomb fired body preferably have a thickness of less than 0.14 mm. The thickness is preferably 0.05 mm or more.

In the honeycomb structured body of the present invention, the shape of the through-holes of the honeycomb fired body is not limited to a quadrangular pillar shape. For example, it may be a triangular pillar shape or a hexagonal pillar shape.

The shapes of the through-holes may be different from each other, but preferably, they are the same. In other words, preferably, the through-holes each surrounded by the partition walls in a cross section perpendicular to the longitudinal direction of the honeycomb fired body have the same size.

In the honeycomb structured body of the present invention, the density of the through-holes in a cross section perpendicular to the longitudinal direction of the honeycomb fired body is preferably 31 to 155 pcs/cm$^2$.

In the honeycomb structured body of the present invention, the honeycomb fired body preferably has a porosity of 45 to 70%.

The honeycomb fired body having a porosity of 45 to 70% can achieve a balance between high mechanical strength and exhaust gas conversion performance.

When the honeycomb fired body has a porosity of less than 45%, the percentage of pores that can contribute to internal diffusion of gas is low in the partition walls, which may result in poor exhaust gas conversion performance. When the honeycomb fired body has a porosity of more than 70 vol %, the porosity is so high that the honeycomb structured body has poor mechanical characteristics, and the honeycomb structured body easily cracks, breaks, or the like during use.

The porosity of the honeycomb fired body can be measured by a weighing method described below.

(1) The honeycomb fired body is cut in size of 10 cells×10 cells×10 mm to obtain a measurement sample. The measurement sample is ultrasonically washed with deionized water and acetone, and dried in an oven at 100° C. The measurement sample having a size of 10 cells×10 cells×10 mm is a sample that is cut out such that the sample includes 10 through-holes aligned longitudinally×10 through-holes aligned transversely, outermost through-holes, and the partition walls constituting the through-holes, with the longitudinal length being 10 mm.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample based on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) The actual weight of the measurement sample is measured using an electric balance (HR202i available from A & D).

(6) The porosity of the honeycomb fired body is determined by the following formula.

(Porosity of honeycomb fired body)=100−(actual weight of measurement sample/weight of measurement sample based on assumption that the measurement sample is a completely dense body)×100[%]

Even when a noble metal is directly supported on the honeycomb structured body of the present invention, changes in the porosity of honeycomb fired body due to the noble metal are small enough to be ignored.

In the honeycomb structured body of the present invention, the honeycomb fired body may further contain alumina particles and an inorganic binder.

The alumina particles are preferably θ-phase alumina particles.

When the alumina particles are θ-phase alumina particles, owing to their high heat resistance, the honeycomb structured body carrying a noble metal can exhibit high exhaust gas conversion performance even after long-term use.

The inorganic binder is preferably boehmite

It is because a large part of boehmite is turned into γ-alumina after firing.

In the honeycomb structured body of the present invention, a noble metal is preferably supported on the honeycomb fired body.

Examples of the noble metal include platinum group metals such as platinum, palladium, and rhodium.

The amount of the noble metal supported in the entire honeycomb fired body is preferably 0.1 to 15 g/L, more preferably 0.5 to 10 g/L.

The term "amount of the noble metal supported" as used herein refers to the weight of the noble metal per apparent volume of the honeycomb structured body. The apparent volume of the honeycomb structured body includes the volume of the pores. When the honeycomb structured body includes an adhesive layer, the apparent volume includes the volume of the adhesive layer.

In the honeycomb structured body of the present invention, a peripheral coat layer may be formed on the outer periphery of the honeycomb fired body.

[Method of Producing Honeycomb Structured Body]

Next, a method of producing the honeycomb structured body of the present invention is described.

The honeycomb structured body of the present invention can be produced by a method including: a molding step of molding a raw material paste containing, for example, CZ particles, alumina particles, inorganic fibers, and an inorganic binder into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step to produce a honeycomb fired body.

(Molding Step)

In the molding step, first, CZ particles and inorganic fibers are mixed together to prepare a raw material paste.

The raw material paste may further contain alumina particles, an inorganic binder, an organic binder, a pore-forming agent, a forming auxiliary, a dispersion medium, or the like.

The CZ particles serve as a co-catalyst (an oxygen storage material) of the exhaust gas catalytic converter. CZ particles are preferably those that form a solid solution of ceria and zirconia.

The CZ particles may further contain a rare earth element in addition to cerium. Example of the rare earth element include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and ruthenium (Lu).

The amount of ceria in the CZ particles is preferably 20 wt % or more, more preferably 40 wt % or more. At the same time, the amount of ceria is preferably 90 wt % or less, more preferably 80 wt % or less. The amount of zirconia in the CZ particles is preferably 60 wt % or less, more preferably 50 wt % or less. Such CZ particles have a low heat capacity. Thus, the temperature of the honeycomb structured body increases easily, which can provide better warm-up performance.

The average particle size of the CZ particles is preferably 1 to 50 μm. The average particle size of the CZ particles is more preferably 1 to 30 μm. When the CZ particles have an average particle size of 1 to 50 μm, the resulting honeycomb structured body has a larger surface area and thus can have a higher oxygen storage capacity.

The alumina particles may be of any type, but θ-phase alumina particles (hereinafter sometimes referred tows "θ-alumina particles") are preferred.

Use of θ-phase alumina particles as dividers between CZ particles can inhibit sintering of alumina particles to one another by heat during use, allowing for sustained catalytic function. Further, use of θ-phase alumina particles can increase heat resistance.

The alumina particles may have any average particle size. Yet, in order to improve gas conversion performance and warm-up performance, the average particle size is preferably 1 to 10 μm, more preferably 1 to 5 μm.

The average particle sizes of the CZ particles and the alumina particles can be determined using a laser diffraction particle size distribution meter (Mastersizer 2000 available from Malvern Panalytical).

Any material may be used to constitute the inorganic fibers. Examples include alumina, silica, silicon carbide, silica alumina, glass, potassium titanate, and aluminum borate. Two or more of these may be used in combination. Of these, alumina fibers are preferred.

The inorganic binder is preferably boehmite.

Boehmite is alumina monohydrate with a composition of AlOOH, and has good dispersibility in media such as water. Thus, boehmite is preferably used as the alumina binder.

Use of boehmite can decrease the moisture percentage in the raw material paste and improve the formability.

Any organic binder may be used. Examples include methyl cellulose, carboxymethyl cellulose, hydroxyethyl cellulose, polyethylene glycol, phenolic resin, and epoxy resin. Two or more of these may be used in combination.

Any pore-forming agent may be used. Examples include acrylic resins, coke, and starch.

The pore-forming agent is one that is used to introduce pores into a honeycomb fired body when producing a honeycomb fired body.

Any forming auxiliary may be used. Examples include ethylene glycol, dextrins, fatty acids, fatty acid soaps, and polyalcohols. Two or more of these may be used in combination.

Any dispersion medium may be used. Examples include water, organic solvents such as benzene, and alcohols such as methanol. Two or more of these may be used in combination.

When the CZ particles, alumina particles, alumina fibers, and alumina binder are used as the materials of the raw material paste, the percentage of each of these materials relative to the total solids remaining in the raw material paste after the firing step is preferably as follows: CZ particles: 25 to 75 wt %; alumina particles: 15 to 35 wt %; alumina fibers: 5 to 20 wt %, and alumina binder: 5 to 20 wt %.

Preparation of the raw material paste preferably involves mixing/kneading. A device such as a mixer or an attritor may be used for mixing, or a device such as a kneader may be used for kneading.

In the molding step, the raw material paste containing CZ particles and inorganic fibers is extruded into a honeycomb molded body in which multiple through-holes are arranged longitudinally in parallel with one another with a partition wall therebetween.

At this point, preferably, preparation conditions and molding conditions of the raw material paste are adjusted by one or more of the following methods (these methods may be used in combination) so that the b-axis thermal expansion coefficient of the honeycomb structured body is higher than the a-axis thermal expansion coefficient thereof.

(1) The fiber length of the inorganic fibers is adjusted. When the inorganic fibers have a longer average fiber length, the inorganic fibers are easily oriented in the a-axis direction. As a result, the thermal expansion coefficient in the a-axis direction decreases.

For example, the inorganic fibers preferably have an average fiber length of 10 to 90 μm.

(2) The flowability of the raw material paste is adjusted (the viscosity is adjusted). When the raw material paste is soft and highly flowable, the inorganic fibers are easily oriented in the a-axis direction. As a result, the thermal expansion coefficient in the a-axis direction decreases. For example, the raw material paste preferably has a shear stress of 500 Pa·s or less at a shear rate of 500 (1/s).

(3) The molding pressure during extrusion is adjusted. When the molding pressure is high, the inorganic fibers are easily oriented in the a-axis direction. As a result, the thermal expansion coefficient in the a-axis direction decreases.

The molding pressure is preferably 4 to 5 MPa, for example.

(4) A net is placed in an extruder, and the mesh of the net (unit) is adjusted. When the mesh of the net is large, the inorganic fibers are easily oriented in the a-axis direction. As a result, the thermal expansion coefficient in the a-axis direction decreases.

The shape of the honeycomb molded body is not limited, but it is preferably a round pillar shape. The round pillar shape preferably has a diameter of 150 mm or less.

Alternatively, the shape of the honeycomb molded body may be a prism shape. The prism shape is preferably a quadrangular pillar shape.

(Drying Step)

Subsequently, the honeycomb molded body is dried to obtain a honeycomb dried body (drying step).

In the drying step, a dryer such as a microwave dryer, a hot-air, dryer, a dielectric dryer, a reduced-pressure dryer, a vacuum dryer, or a freeze-dryer is used to dry the honeycomb molded body to produce a honeycomb dried body.

(Firing Step)

In the firing step, the honeycomb dried body obtained in the drying step is fired into a honeycomb fired body. In this step, the honeycomb dried body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb structured body of the present invention can be produced by the above steps.

(Other Steps)

The method of producing a honeycomb structured body of the present invention may further include a supporting step of allowing a noble metal to be supported on the honeycomb fired body, if necessary.

Examples of the method for allowing a noble metal to be supported on the honeycomb fired body include a method in which the honeycomb fired body or the honeycomb structured body is immersed in a solution containing noble metal particles or a noble metal complex, and the honeycomb fired body or the honeycomb structured body is then pulled up and heated.

When the honeycomb structured body includes a peripheral coat layer, a noble metal may be supported on the honeycomb fired body before the peripheral coat layer is formed, or a noble metal may be supported on the honeycomb fired body or the honeycomb structured body after the peripheral coat layer is formed.

In the method of producing a honeycomb structured body of the present invention, the amount of the noble metal supported in the supporting step is preferably 0.1 to 15 g/L, more preferably 0.5 to 10 g/L.

When the method of producing a honeycomb structured body of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as the raw material paste can be used as the peripheral coat layer paste.

EXAMPLES

Examples that more specifically disclose the present invention are described below. The present invention is not limited to these examples.

[Production of Honeycomb Structured Body]

Example 1

The following materials were mixed/kneaded into a raw material paste: CZ particles (average particle size: 2 μm) (26.5 wt %); θ-alumina particles (average particle size: 2 μm) (13.2 wt %); alumina fibers (average fiber diameter: 3 μm; average fiber length: 60 μm) (5.3 wt %); boehmite as an alumina binder (11.3 wt %); methylcellulose as an organic binder (7.8 wt %); an acrylic resin as an pore-forming agent (1.9 wt %); graphite also as an pore-forming agent (2.3 wt %); polyoxyethylene oleyl ether (surfactant) as a forming auxiliary (4.3 wt %); and deionized water (27.4 wt %).

[Molding Step]

Using an extruder, the raw material paste was extruded into a round pillar-shaped honeycomb molded body.

A net was placed in the extruder.

The mesh and the molding pressure are as shown in Table 1. The mesh number was 42, and the molding pressure was 4.5 MPa.

[Drying Step]

Using a microwave dryer, the honeycomb molded body was dried with an output of 1.8 A and a microwave irradiation time of 110 seconds.

[Firing Step]

The resulting honeycomb dried body was degreased/fired at 1100° C. for 10 hours, whereby a honeycomb fired body according to Example 1 was produced. The honeycomb fired body had a round pillar shape with a diameter of 117 mm and a length of 80 mm in which the density of the through-holes was 77.5 pcs/cm$^2$ (500 cpsi) and the thickness of the partition wall was 0.127 mm (5 mil).

Examples 2 and 3 and Comparative Example 1

Honeycomb structured bodies were produced as in Example 1, except that a raw material paste was prepared and extruded by changing the average fiber length of the alumina fibers in the raw material paste and the mesh number and the molding pressure in the molding step.

Table 1 shows the results.

[Measurement of Thermal Expansion Coefficient]

The a-axis thermal expansion coefficient and the b-axis thermal expansion coefficient were measured using a thermal expansion meter.

The thermal expansion meter was DIL 402C available from NETZSH.

The measurement temperature range was 40° C. to 800° C., the heating Tate was 10° C./min, and the gas flow rate was 100 ml/min in air. The reference material was sapphire.

The size of a test piece was 3.5 mm×3.5 mm (3 cells×3 cells)×25 mm.

The a-axis thermal expansion coefficient and the b-axis thermal expansion coefficient were measured for each of five test pieces, and the average was calculated as a measurement result. Table 1 shows the results.

[Measurement of Degree of Orientation]

Cross-sectional images of the honeycomb structured bodies of the examples and the comparative examples were taken. The ratio of long axis/short axis was calculated for each of 100 inorganic fibers shown in each cross-sectional image, and the proportion of inorganic fibers each having a ratio of long axis/short axis of 1.00 to 1.30 was determined. This proportion was regarded as the "degree of orientation". Table 1 shows the results.

[Observation of Cracking State and Crack Size]

Hot gas was introduced into the honeycomb structured body to increase the temperature of the honeycomb structured body to 1000° C., followed by cooling to room temperature in 15 seconds. This cycle was repeated 30 times to perform a thermal shock test to cause cracking in the honeycomb structured body.

After causing cracking in the honeycomb structured body, the direction of cracking and the maximum crack size were measured. Table 1 shows the results.

The direction of cracking is indicated as "a-axis direction" for cracking along the a-axis, and is indicated as "Ring-off" for ring-off cracking (cracking along the b-axis direction).

As shown in Table 1, in each of the honeycomb structured bodies of Example 1-3, the b-axis thermal expansion coefficient is higher than the a-axis thermal expansion coefficient, and cracks are oriented in the a-axis direction. Additionally, the crack size is smaller.

This shows that it is possible to produce a honeycomb structured body less susceptible to ring-off cracking when a temperature difference occurs in the honeycomb structured body, by adjusting the relationship between the a-axis thermal expansion coefficient and the b-axis thermal expansion coefficient.

REFERENCE SIGNS LIST 10 honeycomb structured body
11 honeycomb fired body
12 through-hole
13 partition wall
14 outer peripheral wall

The invention claimed is:

1. A honeycomb structured body comprising:
a honeycomb fired body in which multiple through-holes are arranged longitudinally in parallel with one another with a partition wall therebetween,
wherein the honeycomb fired body contains ceria-zirconia composite oxide particles and inorganic fibers,
a b-axis thermal expansion coefficient measured in a direction along a b-axis representing a direction perpendicular to a longitudinal direction of the honeycomb structured body is higher than an a-axis thermal expansion coefficient measured in a direction along an a-axis representing the longitudinal direction of the honeycomb structured body,
the a-axis thermal expansion coefficient is $7.5 \times 10^{-6}$/K or more and less than $8.0 \times 10^{-6}$/K, and
the b-axis thermal expansion coefficient is $8.0 \times 10^{-6}$/K or more and $8.5 \times 10^{-6}$/K or less.

2. The honeycomb structured body according to claim 1, wherein a difference between the b-axis thermal expansion coefficient and the a-axis thermal expansion coefficient ((b-axis thermal expansion coefficient)−(a-axis thermal expansion coefficient)) is 0.1 to $1.0 \times 10^{-6}$/K.

3. The honeycomb structured body according to claim 1, wherein at least 60% of inorganic fibers observed in a cross-sectional image of the honeycomb structured body cut in a cross-sectional direction perpendicular to the longitudinal direction have a ratio of the length of a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

4. The honeycomb structured body according to claim 2, wherein at least 60% of inorganic fibers observed in a cross-sectional image of the honeycomb structured body cut in a cross-sectional direction perpendicular to the longitudinal direction have a ratio of the length of

TABLE 1

| | Alumina fiber | | Molding conditions | | Physical properties of honeycomb structured body | | | | | |
|---|---|---|---|---|---|---|---|---|---|---|
| | Average fiber length (μm) | Mesh of net | Modling pressure (MPa) | a-axis thermal expansion coefficient ($\times 10^{-6}$/K) | b-axis thermal expansion coefficient ($\times 10^{-6}$/K) | Difference ($\times 10^{-6}$/K) | Degree of orientation (%) | Direction of cracking | Maximum crack size (mm) |
| Example 1 | 60 | #42 | 4.5 | 7.8 | 8.3 | 0.5 | 70 | a-axis direction | 10 |
| Example 2 | 70 | #36 | 4.1 | 7.9 | 8.2 | 0.3 | 60 | a-axis direction | 15 |
| Example 3 | 90 | #50 | 4.7 | 7.6 | 8.4 | 0.8 | 80 | a-axis direction | 15 |
| Comparative Example 1 | 40 | #30 | 4.1 | 8.0 | 8.0 | 0 | 55 | Ring-off | 100 | a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

* * * * *